United States Patent [19]
Calderon

[11] Patent Number: 5,063,732
[45] Date of Patent: Nov. 12, 1991

[54] METHOD FOR REPOWERING EXISTING ELECTRIC POWER PLANT

[75] Inventor: Albert Calderon, Bowling Green, Ohio

[73] Assignee: Calderon Automation, Inc., Bowling Green, Ohio

[21] Appl. No.: 527,053

[22] Filed: May 22, 1990

Related U.S. Application Data

[62] Division of Ser. No. 198,862, May 26, 1988, Pat. No. 4,609,541.

[51] Int. Cl.$^5$ ............................ F02G 3/00; F02C 6/04
[52] U.S. Cl. .................................. 60/39.02; 60/39.12; 60/39.182
[58] Field of Search ...................... 18/197 R; 60/39.02, 60/39.12, 39.182

[56] References Cited

U.S. PATENT DOCUMENTS

| | | | |
|---|---|---|---|
| 2,634,198 | 4/1953 | Kalbach | 201/16 |
| 2,992,065 | 7/1961 | Feustel | 55/79 |
| 4,261,167 | 4/1981 | Paull et al. | 60/39.02 |
| 4,608,818 | 9/1986 | Goebel et al. | 60/39.12 |
| 4,665,688 | 5/1987 | Schiffers et al. | 60/39.12 |
| 4,729,217 | 3/1988 | Kehlhofer | 60/39.182 |
| 4,852,996 | 8/1989 | Knop | 60/39.12 |

Primary Examiner—Louis J. Casaregola
Assistant Examiner—John A. Savio, III

[57] ABSTRACT

A method for the repowering of an existing coal-fired facility used in the generation of electric power which makes the facility more efficient while reducing its emissions in a cost-effective manner using the following steps: a) processing the coal in use to co-produce a clean liquid fuel and a clean low Btu gas; b) replacing the pulverized coal burners of the boiler contained in the facility with burners adapted to burn low-Btu gas; c) burning clean low-Btu gas in the boiler instead of coal; d) making up the derate of the boiler by the addition of efficient combined cycle power generation; and e) crediting the revenue derived from the sale of the liquid fuel co-produced to the existing facility to render such repowering commercially viable.

20 Claims, 4 Drawing Sheets

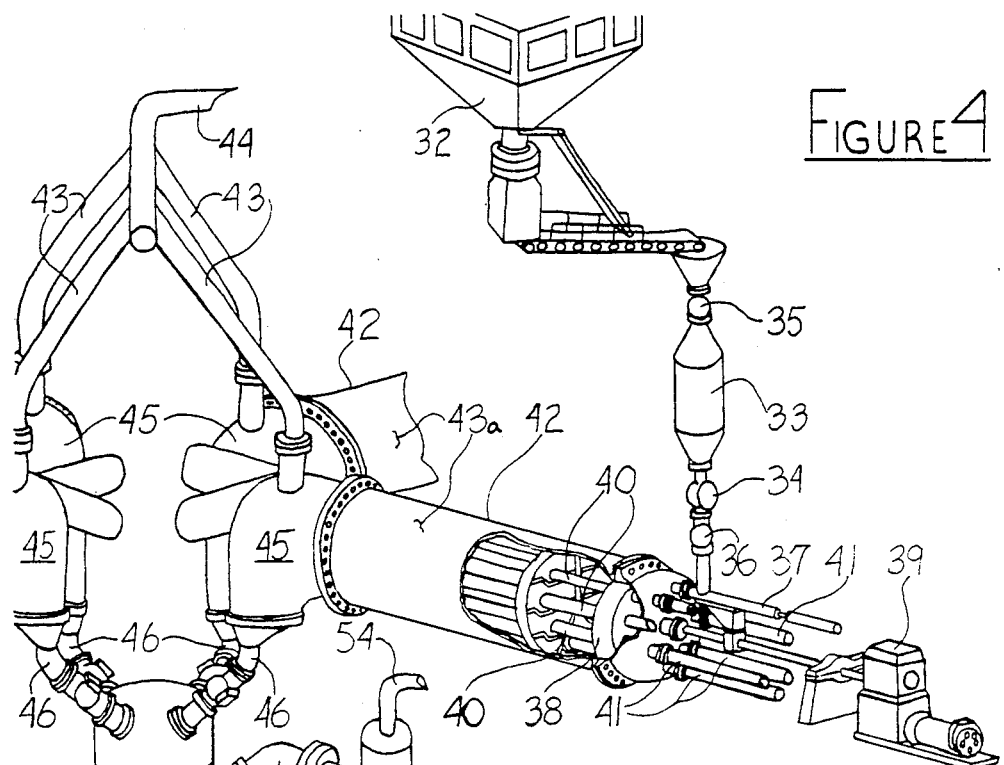
FIGURE 4
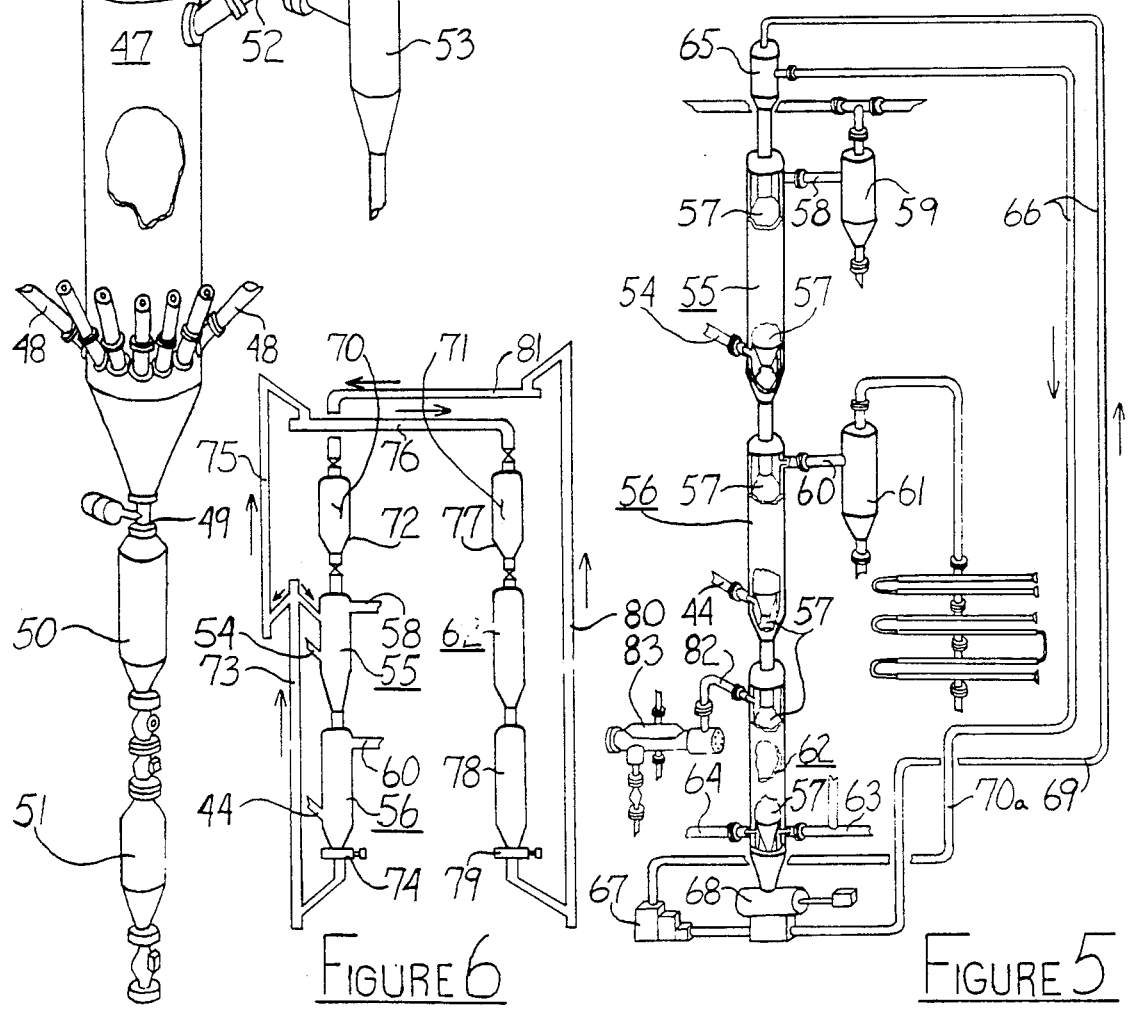
FIGURE 6
FIGURE 5

METHOD FOR REPOWERING EXISTING ELECTRIC POWER PLANT

BACKGROUND

This invention is a division of the now pending application of the applicant bearing Ser. No. 07/198,862 filed on May 26, 1988 U.S. Pat. No. 4,609,541.

This pending application, among other inventions, also discloses the repowering of an existing coal-buring electric power generating facility wherein the co-production of clean fuel and electric power results in cost-effective benefits which not only provide acceptable pollution controls for such facility but also in cash flows which are large enough to pay for the repowering of the existing coal-burning facility.

The disclosure in said pending application covers the pressurized pyrolyzation of coal to produce a rich gas made up of gases and vapors, and a residue in the form of a char which is gasified under pressure with air to produce a lean gas. The rich gas and the lean gas are segregated and are cleaned while hot in a hot gas cleanup system to co-produce a clean rich gas (syngas) suitable for use as a feedstock for the making of chemicals including fuel grade methanol, and a clean lean gas which after expansion is suitable as a very clean fuel for burning in the existing boiler which conventionally burns coal; this boiler comprising the major component of the existing power generation facility. This invention therefore makes use of the coal handling system, the boiler, the generator, and the main services of the existing facility, and replaces the pulverized coal burners by low Btu burners in order to burn the said lean gas instead of pulverized coal.

Since 85% of the transboundary $SO^2$ emissions which cause acid rain originate from coal-burning utility boilers, it is essential to drastically curtail the emissions from these boilers and yet do this in an environmentally and cost effective manner. Currently, legislation is being enacted in Congress to control the $SO^2$ emissions from 107 power plants. One method for the control of such emissions consists in the installation of scrubbers. Another solution is the use of compliance coal whose content of sulfur must be quite low. The installation of scrubbers is a very costly program, produces solid waste, adds to maintenance costs, and reduces the efficiency of the plant. The use of compliance coal adds to the cost of the fuel and eliminates mining jobs in the high-sulfur coal fields causing unemployment.

OBJECTIVES OF THE INVENTION

The instant invention solves the above disadvantages and yet uses high-sulfur coal in an economically and environmentally acceptable manner, thereby salvaging the existing coal burning facilities.

Therefore, the main object of the present invention is to repower the existing coal burning facilities used in the generation of electric power while providing pollution control for such facilities with minimum change to the facilities themselves.

Another object of the present invention is to repower the existing coal burning facilities used in the generation of electric power at no out-of-pocket expenditure for such repowering.

Still another object of the present invention is to repower the existing coal burning facilities used in the generation of electric power in such a way as to yield economic incentives to make such repowering commercially viable.

Yet another object of the present invention is to repower the existing coal burning facilities used in the generation of electric power, in such a way as to demand the minimum shut-down of said facilities during such repowering.

It is therefore another object of the instant invention to repower the existing coal burning facilities used in the generation of electric power in such a way as to increase the capacity of said facilities.

It is still another object of the present invention to repower the existing coal burning facilities used in the generation of electric power in such a way as to make said facilities more efficient.

It is yet another object of the present invention to repower the existing coal burning facilities used in the generation of electric power in such a way as to reduce the maintenance of said facilities as well as extend the useful life of said facilities.

These and other objects of the instant invention will become more apparent to those skilled in the art to which this invention pertains and particularly from the following description and appended claims.

SUMMARY OF THE INVENTION

The instant invention repowers the existing coal burning facilities used in the generation of electric power in the manner illustrated in the following description of a facility whose cpacity is, by way of example, a 509 MW Plant. This plant mainly possesses coal receipt, storage and supply; a steam boiler equipped with pulverization mills, pulverized coal burners and bottom ash handling; a precipitator for particulate removal; and, a steam turbine attached to a turbogenerator. The repowering consists of the installation of a coal gasification plant of a unique design to co-produce liquid transport fuel and a lean gas under pressure. The lean gas after cleanup is divided into two streams: the first stream is directed through an expander and into the boiler where this lean gas is burned instead of pulverized coal and the second stream while still under pressure is directed to a newly installed gas turbine which is accompanied by a waste heat boiler followed by a steam turbine; the gas turbine, waste heat boiler and steam turbine configuration is commonly known as combined cycle. Since the burning of lean gas in a boiler which is designed to burn coal, causes a derate of the boiler by as much as 40%, the loss of this rating is made up by the added capacity from an expander preceeding the boiler and by the combined cycle.

By burning clean gas in the boiler, the following advantages ensue:
1) Elimination of ash from the boiler;
2) Elimination of the pulverization mills;
3) Elimination of the precipitator; and
4) Increase in the availability of the boiler.

These advantages plus an increase in capacity together with the credits derived from the sale of the transport fuel makes the repowering a very profitable venture in addition to solving the problem of pollution from power generation facilities caused by the oxides of sulfur and nitrogen.

Reference is now made to the accompanying drawings forming a part of this specification wherein like reference characters designate corresponding parts in the various views. It is to be noted that the embodiments shown herein are for the purpose of description and not limitation.

BRIEF DESCRIPTION OF DRAWINGS

FIG. 4 is the gasification system used for the co-production of a rich gas for the making of liquid fuel and of a lean gas used in the repowering of the facility for the efficient generation of electric power.

FIG. 5 is the hot gas cleanup system for treating the lean gas, and treating and cracking of the rich gas to make it suitable as a feed stock for liquid fuel production, used in the repowering.

FIG. 6 is an alternate arrangement for the hot gas cleanup system for treating the gases.

Before proceeding with the detailed description of the invention by means of the drawings, it is to be noted that for the sake of clarity, reference will be made with numerals to represent the various components of the invention.

DETAILED DESCRIPTION OF THE DRAWINGS

Figure 1:
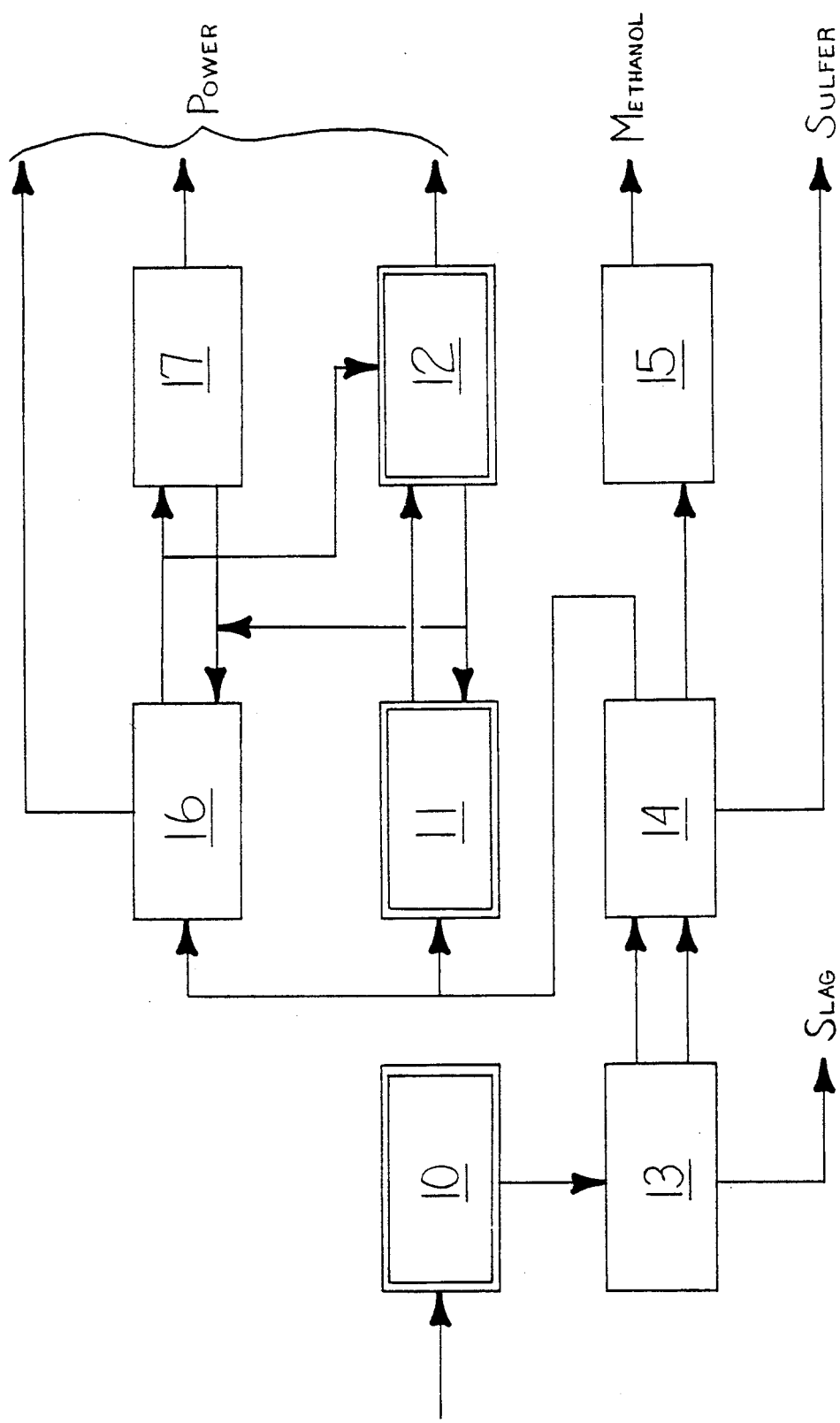
FIG. 1 is a general process flow diagram in which the boxes marked by double border lines represent existing facilities and in which the boxes marked by single border lines represent the newly added facilities.

In FIG. 1, reference numeral 10 is the receipt, storage and supply of the coal to the plant, and reference numeral 11 is the existing boiler in which the pulverized coal burners have been replaced by lean gas burners. Reference numeral 12 represents the steam cycle and the turbo-generator. The equipment represented by numerals 10, 11 and 12 are existing components of the plant.

Reference numeral 13 is the part of the plant used to make a rich gas from coal via pyrolysis and a lean gas from the resitual char of the coal via gasification using air as the oxidant. Reference numeral 14 is the hot gas cleanup for both the rich gas and the lean gas. The rich gas is cracked and treated for sulfur removal and the lean gas is treated for sulfur removal in the component of the repowered plant represented by numeral 14. Reference numeral 15 represents the synthesis plant for making liquid fuel such as methanol from the rich gas. Synthesis plant 15 may be used to make other chemicals such as synthetic natural gas, gasoline, hydrogen, ammonia, etc. instead of methanol. Reference numeral 16 is the combustion gas turbine integrated to a waste heat boiler and reference numeral 17 is the steam cycle which is operated with steam from the waste heat boiler which in turn raises steam with flue gas from the gas turbine.

Figure 2:
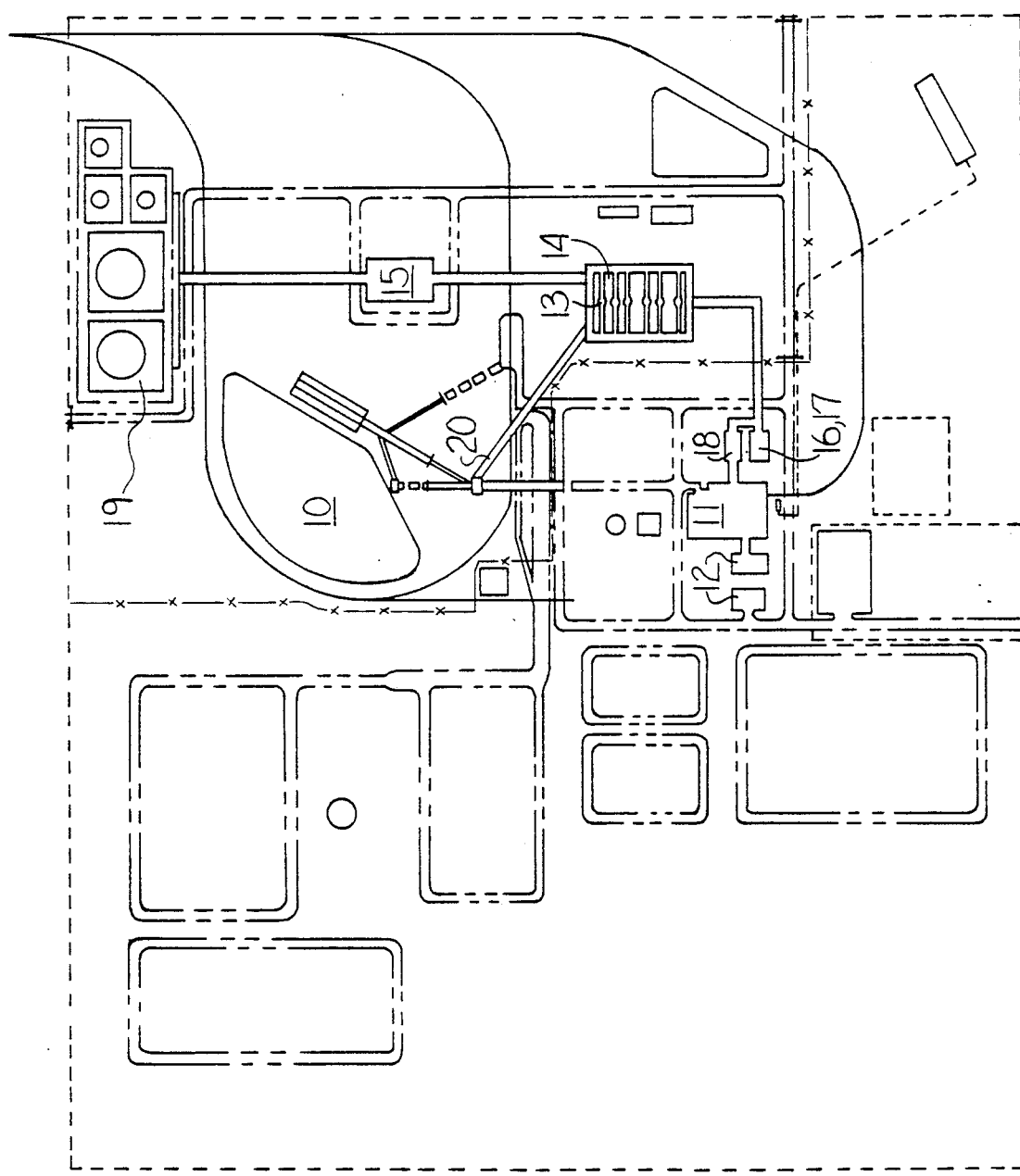
FIG. 2 is a plan view of the repowered power plant in which the facilities shown in phantom are the facilities which exist and which are left intact; the facilities shown in solid lines are the facilities that are added and the boiler which is slightly modified.

Referring to FIG. 2, 10 is the receipt, storage and supply of the coal to the plant, 11 is the existing boiler, and 12 is the existing steam cycle tied to the turbo-generator. Reference numeral 13 is the pyrolysis and gasification components of the plant and 14 is the hot gas cleanup. Reference numeral 15 is the methanol plant, and numerals 16 and 17 represent the combined cycle configuration for the generation of power to make up for the derate. Reference numeral 18 is an expander for the lean gas prior to its combustion in boiler 11. A liquid fuel storage is provided in tanks as represented by numeral 19. A conveyor represented by numeral 20 is added to direct coal from storage 10 to pyrolysis/gasification 13.

Figure 3:
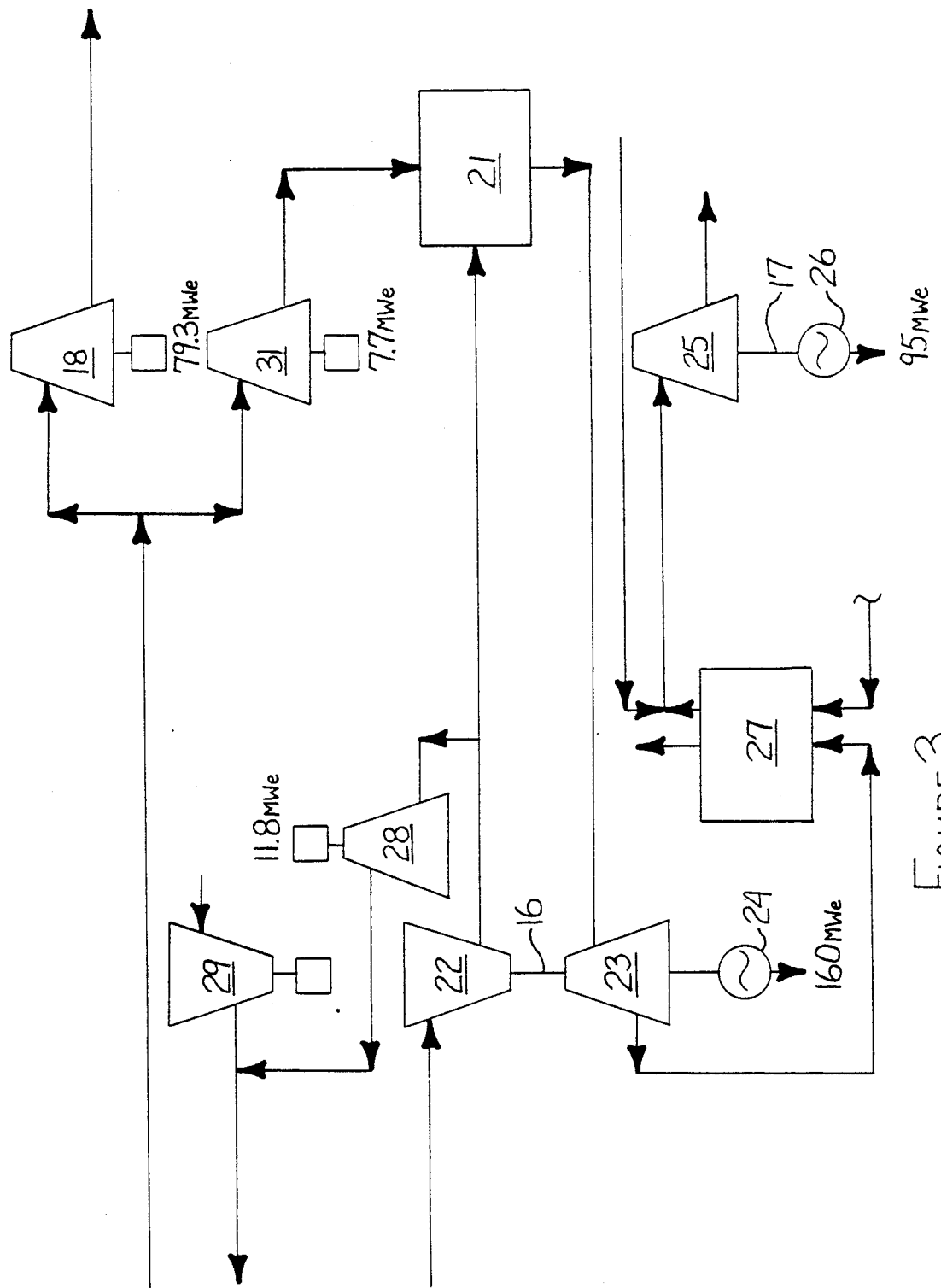
FIG. 3 is a flow diagram showing the various electric power generation units of the repowered plant.

Referring to FIG. 3 for a more detailed description of the power generation combined cycle complex, numeral 16 is the gas turbine cycle and numeral 17 is the steam cycle; numeral 18 represents the expander for the existing boiler. Gas turbine cycle 16 is made up mainly of four (4) components: a combustion chamber represented by numeral 21, a compressor represented by numeral 22, an expander represented by numeral 23 and a generator represented by numeral 24. Steam turbine cycle 17 is made up mainly of steam turbine 25 and generator 26. A waste heat boiler also known as a heat recovery steam generator represented by numeral 27 is interposed between expander 23 and steam turbine 25; this waste heat boiler recovers thermal energy from the flue gas which leaves the gas turbine to generate steam which steam is used to drive steam turbine 25 thus increasing the efficiency of the entire system. Air from compressor 22 is divided into two portions. One portion is directed to combustion chamber 21 and the second portion to a booster-compressor represented by numeral 28. An auxilliary compressor denoted by numeral 29 is also provided. Both booster-compressor 28 and auxilliary compressor 29 are required to supply the air for the gasifier which is shown in FIG. 4 which shall be described hereinafter. To balance the system, a secondary expander for the gas turbine is provided and denoted by numeral 31.

Referring to FIG. 4, for the detailed description of the coal processing into gases and their cleanup, coal is delivered from a bunker represented by numeral 32 to a lockhopper which is represented by reference numeral 33. Lockhopper 33 is equipped with feeder 34 and upper isolation valve 35 and lower isolation valve 36. A packing ram represented by numeral 37 pushes the coal into an accumulator which is represented by numeral 38. Accumulator 38 preferably takes the shape of a revolving wheel having multi-holes which is rotated by means of drive 39. As coal is packed into each one of the plurality of holes in accumulator 38, the accumulator is indexed so as to align the packed holes with pyrolysis tubes which are denoted by reference numeral 40. Each pyrolysis tube is individually charged with coal by means of individual pushing rams which are represented by numeral 41.

Pyrolysis tubes 40 which preferably are substantially horizontal are grouped together in a bundle such as bundle 42 and each bundle may be enveloped in a pressure shell as denoted by numeral 43a. Pyrolysis tubes 40 are heated individually and indirectly in order to heat the coal uniformly as the coal is pushed along the length of each tube. As such heating of the coal takes place, the volatile matter is driven out of the coal. A manifold system is provided to collect the volatile matter; such manifold is represented by numeral 43. The volatile matter which is also called "rich gas" leaves via a duct which is represented by numeral 44. The residual char remaining after the pyrolysis of the coal is discharged through elbows 45 via duct 46 into the gasification vessel which is represented by reference numeral 47. Gasification vessel 47 is an elongated vertical shaft equipped with tuyeres 48 for the injection of an oxidant such as air or pure oxygen, a slag discharge nozzle 49, a slag quenching hopper 50 and a slag lockhopper 51.

Compressed air from booster-compressor 28 and auxilliary compressor 29 shown in FIG. 3, supply the air to tuyeres 48. At the top of gasification vessel 47, a duct denoted by numeral 52 is provided to collect the gas produced from the gasification of the char. This gas which is also known as "lean gas", is passed through a cyclone denoted by reference numeral 53 which serves to remove particulate matter from the lean gas prior to its cleanup in the hot gas system shown in FIG. 5 or FIG. 6. This lean gas leaves the top of cyclone 53 via duct 54.

Referring to FIG. 5, the lean gas from duct 54 (extension of duct 54 FIG. 4) enters a contactor represented by numeral 55 which serves to clean the lean gas; the rich gas from duct 44 (extension of duct 44 FIG. 4) enters a cracker represented by numeral 56 which serves to simultaneously crack and desulfurize the rich gas. Both contactor 55 and cracker 56 contain a sorbent 57 such as lime (CaO) which is used as a desulfurizing agent and as a catalyst for cracking hydrocarbons contained in the gases. The lean gas leaving the top of gasification vessel 47 is quite hot around 1900° F.-2000° F., and this hot lean gas heats sorbent 57 in contactor 55 as it filters through and exits contactor 55 via duct 58. Any particulate matter entrained in the lean gas is removed in a cyclone which is denoted by numeral 59. The heated sorbent 57 in contactor 55, flows downward by gravity into cracker 56 where it is used to desulfurize the rich gas which rich gas enters the bottom of cracker 56 through duct 44 and exits cracker 56 through duct 60; the thermal energy for the endothermic reaction of cracking the hydrocarbons in the rich gas is provided by the hot sorbent 57 which was pre-heated by direct contact in contactor 55 by means of the lean gas prior to the descent of sorbent 57 from contactor 55 to cracker 56. A cyclone denoted by numeral 61 is provided to remove any particulate from the hot rich gas which now is in the form of a syngas, leaving cracker 56. Cracker 56 serves to desulfurize the rich gas and crack all of the hydrocarbons to yield a clean syngas essentially made-up of $H_2$ and CO.

Sorbent 57 descends from cracker 56 to a sorbent regenerator which is represented by reference numeral 62. Regenerator 62 is equipped with means for the injection of air through duct 63 and steam through duct 64 to regenerate sorbent 57. The exit regeneration gas leaves regenerator 62 via duct 82 and enter a sulfur condenser for the precipitation of elemental sulfur, which is denoted by numeral 83. Sorbent 57 recirculates from the bottom of regenerator 62 to the top of classifier 65 which feeds sorbent 57 to contactor 55. The recirculating means may be any one of known systems such as a pneumatic system which is represented by numeral 66 which mainly comprises compressor 67, feeder 68 and conveying ducting 69 and 70a.

Referring to FIG. 6, to describe the alternate system for the hot gas cleanup, two columns are provided; column 70 to be used for absorption and column 71 to be used for regeneration. Column 70 comprises a lockhopper denoted by a numeral 72, and contactor 55 and cracker 56 which have been described above. Column 70 also possesses sorbent recirculating conveyor (bucket elevator) represented by numeral 73 and feeder 74 in order to recirculate the sorbent between cracker 56 and contactor 55 until the sorbent is spent at which time conveyor 73 discharges the spent sorbent to an elevating conveyor which is denoted by numeral 75 which in turn feeds the spent sorbent to horizontal conveyor 76. Conveyor 76 is used to transfer the spent sorbent to regeneration column 71.

Column 71 comprises a lockhopper above regenerator 62 which is denoted by numeral 77 and a surge hopper below regenerator 62 which is denoted by numeral 78. Using feeder 79 which is located at the bottom of surge hopper 78, in conjunction with elevator conveyor denoted by numeral 80 and horizontal conveyor 81, the sorbent is after regeneration transferred from regeneration column 71 to absorption column 70.

Operation

In repowering the power plant referred to above whose current capacity is 509 MWe and shown in FIG. 2 in plan view, the complex for gasification represented by numerals 13 and 14, the methanol plant represented by numeral 15, and the combined cycle represented by numerals 16 and 17 are first constructed in a period of about 2 years without disturbing the generation of power from the coal burning boiler which is represented by numeral 11. Once the new complex is shaken down, the combined cycle takes over while boiler 11 is shut down for the installation of the low-Btu (lean) gas fuel burners into the existing auxilliary air compartments, after the removal of the pulverized coal burners. By boiler 11 using the low-Btu gas for fuel, it is estimated that the boiler will be derated from 509 MWe to 310 MWe; it is for this reason that the combined cycle is added to make-up this derate. The combined cycle capability as shown in FIG. 3 is as follows:

| | |
|---|---|
| Expander 18 | 79.3 MWe |
| Expander 31 | 7.7 MWe |
| Gas Turbine 23 | 1160.0 MWe |
| Steam Turbine 25 | 95.0 MWe |
| Sub-total | 342.0 MWe |
| Less: | |
| Compressor Booster 28 | 11.8 MWe |
| Auxiliary Compressor 29 | 77.2 MWe |
| Net Combined Cycle | 253.0 MWe |
| Total Capacity of Plant: | |
| Boiler 11 on Lean Gas | 310 MWe |
| Combined Cycle Net | 253 MWe |
| Total New Capacity | 563 MWe |
| Net gain by repowering: | 563 MWe |
| | −509 MWe |
| | 54 MWe |
| Net Gain in Percent | 54 × 100/509 = 10.6% |

Since the only change to boiler 11 consists of replacement of the pulverized coal burners by lean gas burner nozzles, the cost for such conversion is minimal and would take around 90 days, during which time the boiler will not be available. By repowering boiler 11 to burn lean gas instead of pulverized coal, sulfur emissions would be drastically reduced and the oxides of nitrogen (NOx) will be at a minimum (20 parts/million) by virtue that low-Btu (lean) gas produces very little $NO_x$ because it burns cooler.

The procedure for repowering disclosed herein which consists of the co-production of electric power and methanol will result in increasing the availability of boiler 11 from 75% to 90% (historically gas fired boilers have better than 90% capacity factor); the decrease in maintenance because of the elimination of the pulverizers, the precipitators and the ash from boiler 11; methanol is used as a backup fuel for both boiler 11 and combined cycle 16 to augment reliability; and the decrease in operating costs because of the cash credits derived from the sale of the methanol.

Besides making repowering of existing coal burning electric power plants a profitable venture while at the same time drastically reducing emissions from them at no out-of-pocket costs, the co-production of methanol or other liquid fuels to substitute petroleum liquids would be of great importance to the economy and security of the United States. When methanol is converted to gasoline as in the process of Mobile Oil (MTG process) the quantity of imported petroleum liquids could be drastically curtailed.

I claim:

1. A method of increasing the efficiency of an existing coal-burning facility while reducing emissions from same in a cost-effective manner comprising the following steps:
   a) Installing a coal processing means capable of pyrolyzing coal under pressure to produce a raw rich gas and a hot char, and said processing means being also capable of gasifying the hot char to produce a raw lean gas;
   b) Installing a hot gas processing means capable of desulfurizing and cracking, said raw rich gas under pressure to yield a syngas which is substantially made up of $H_2$ and CO in composition;
   c) Installing facilities that are capable of converting said syngas into a marketable chemical;
   d) Installing a hot gas processing means capable of desulfurizing said hot lean gas under pressure to yield a clean, hot, low-Btu gas;
   e) Replacing the pulverized coal burners of the boiler contained in said facility with burners adapted to the burning of low-Btu gas in order to burn low-Btu gas instead of pulverized coal in said boiler;
   f) Splitting said clean, hot low-Btu gas into a first stream and a second stream;
   g) Expanding the low-Btu gas in said first stream to accommodate the pressure requirement of said boiler;
   h) Combusting the expanded low-Btu gas in said boiler to produce steam which in turn generates electricity by turning the steam turbine tied to the generator which exist in said facility;
   i) Combusting the low-Btu gas in said second stream in a newly installed gas combustion turbine to generate additional electric power to make up for the derate sustained by said boiler when low-Btu gas is burned instead of coal in said boiler.

2. The method as set forth in claim 1 wherein said step of combusting the low-Btu gas in said second stream in a newly installed gas combustion turbine to generate additional electric power is further characterized by the step of directing the products of combustion from said gas combustion turbine to a heat recovery steam generator to raise steam which is in turn directed to a steam turbine tied to a generator in order to generate still more electric power via the combined cycle mode.

3. The method as set forth in claim 1 wherein the step of installing a coal processing means capable of pyrolyzing coal under pressure to produce a raw rich gas is further characterized by the step of providing multi-tubes grouped in a bundle wherein each tube is individually charged with coal and is individually heated in order to result in uniform pyrolyziation of the coal.

4. The method as set forth in claim 3 wherein the step of providing multi-tubes grouped in a bundle wherein each tube is individually charged with coal and is individually heated is further characterized by the step of carrying out the charging of the coal and the heating thereof under pressure.

5. The method as set forth in claim 1 wherein said step of installing a coal processing means capable of gasifying the hot char with air to produce a hot raw lean gas is further characterized by the step of carrying out the gasification of said char under such pressure as to accommodate the pressure required by a gas combustion turbine.

6. The method as set forth in claim 1 wherein the step of installing a hot gas processing means capable of desulfurizing and cracking said rich gas under pressure and the step of installing a hot gas processing means capable of desulfurizing said hot lean gas under pressure are further characterized by the step of lifting a sorbent which serves as a desulfurizing agent from said means capable of desulfurizing and cracking said rich gas to said means capable of desulfurizing said hot lean gas and by the step of gravitationally feeding said sorbent from said means capable of desulfurizing said hot lean gas to said means capable of desulfurizing and cracking said rich gas in order to provide a recirculating pattern to said sorbent.

7. The method as set forth in claim 6 wherein said step of lifting said sorbent from said means capable of desulfurizing and cracking said rich gas to said means capable of desulfurizing said hot lean gas is further characterized by the step of heating said sorbent by means of said hot lean gas in said means capable of desulfurizing said hot lean gas, to such an extent as to have the sorbent at such an elevated temperature sufficient to crack hydrocarbons.

8. The method as set forth in claim 7 wherein said step of heating said sorbent by means of said hot lean gas in said means capable of desulfurizing said hot lean gas, to such an extent as to have the heated sorbent at such temperature sufficient to crack hydrocarbons is further characterized by the step of employing the thermal energy contained in said sorbent to crack the hydrocarbons contained in the rich gas passed through said means capable of desulfurizing and cracking said rich gas.

9. The method as set forth in claim 7 wherein said step of heating said sorbent by means of said hot lean gas in said means capable of desulfurizing said hot lean gas, to such an extent as to have the heated sorbent at such an elevated temperature sufficient to crack hydrocarbons is further characterized by the step of gravitationally feeding said heated sorbent from said means capable of desulfurizing said hot lean gas to said means capable of desulfurizing and cracking said rich gas.

10. The method as set forth in claim 6 wherein said step of lifting said sorbent which serves as a desulfurizing agent from said means capable of desulfurizing and cracking said rich gas to said means capable of desulfurizing said hot lean gas is further characterized by the step of directing said sorbent to a sorbent regeneration means from said means capable of desulfurizing and cracking said rich gas when said sorbent becomes spent.

11. The method as set forth in claim 10 wherein said step of directing said sorbent to a sorbent regeneration means is further characterized by the step of returning said sorbent after its regeneration to said means capable of desulfurizing said hot lean gas.

12. The method as set forth in claim 3 wherein said step of providing multi-tubes grouped in a bundle wherein each tube is individually charged with coal and is individually heated in order to result in uniform pyrolyzation of the coal is further characterized by the step of indirectly heating the coal in each individual tube.

13. The method as st forth in claim 1 wherein the step of installing facilities that are capable of converting said syngas into a marketable chemical is further characterized by the step of converting said syngas to a fuel.

14. The method as set forth in claim 1 wherein the step of installing facilities that are capable of converting said syngas into a marketable chemical is further characterized by the step of converting said syngas to synthetic natural gas.

15. The method as set forth in claim 1 wherein the step of installing facilities that are capable of converting said syngas into a marketable chemical is further characterized by the step of converting said syngas to methanol.

16. The method as set forth in claim 1 wherein the step of installing facilities that are capable of converting said syngas into a marketable chemical is further characterized by the step of converting said syngas to gasoline.

17. The method as set forth in claim 1 wherein the step of installing facilities that are capable of converting said syngas into a marketable chemical is further characterized by the step of converting said syngas to hydrogen.

18. The method as set forth in claim 1 wherein the step of installing facilities that are capable of converting said syngas into a marketable chemical is further characterized by the step of converting said syngas to ammonia.

19. The method as set forth in claim 3 wherein the step of providing multi-tubes grouped in a bundle wherein each tube is individually charged with coal is further characterized by the step of providing a revolving means adapted to take coal and having indexing features for alignment with each individual tube to be charged.

20. The method as set forth in claim 1 wherein the step of providing a revolving means adapted to take coal and having indexing features for alignment with each individual tube to be charged is further characterized by the step of turning said revolving means for alignment being performed without loss of pressure from the vessel within which said revolving means is contained.

* * * * *